US012444392B2

(12) United States Patent
Tadano et al.

(10) Patent No.: US 12,444,392 B2
(45) Date of Patent: Oct. 14, 2025

(54) TONE PLATE AND PERCUSSION INSTRUMENT

(71) Applicant: YAMAHA CORPORATION, Hamamatsu (JP)

(72) Inventors: Yuichi Tadano, Hamamatsu (JP); Ayumi Irisa, Hamamatsu (JP); Kazuki Soga, Hamamatsu (JP); Junnosuke Kaseda, Hamamatsu (JP); Hisaaki Mukai, Hamamatsu (JP); Eri Hirai, Hamamatsu (JP); Ichiro Osuga, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 256 days.

(21) Appl. No.: 18/467,077

(22) Filed: Sep. 14, 2023

(65) Prior Publication Data

US 2024/0005895 A1 Jan. 4, 2024

Related U.S. Application Data

(63) Continuation of application No. PCT/JP2021/046141, filed on Dec. 14, 2021.

(30) Foreign Application Priority Data

Mar. 16, 2021 (JP) ................................ 2021-042855

(51) Int. Cl.
*G10D 13/08* (2020.01)

(52) U.S. Cl.
CPC .................................. *G10D 13/08* (2013.01)

(58) Field of Classification Search
CPC ..................................................... G10D 13/08
See application file for complete search history.

(56) References Cited

U.S. PATENT DOCUMENTS

| | | | | |
|---|---|---|---|---|
| 4,411,187 A * | 10/1983 | Roper | .................... | G10D 13/08 984/155 |
| 10,453,433 B2 * | 10/2019 | Hirai | .................... | B27K 3/0221 |
| 2003/0167899 A1 | 9/2003 | Abe et al. | | |

(Continued)

FOREIGN PATENT DOCUMENTS

| | | | | |
|---|---|---|---|---|
| JP | 2003084759 A * | 3/2003 | ............. | G10D 13/08 |
| JP | 2004058416 A | 2/2004 | | |

(Continued)

OTHER PUBLICATIONS

Office Action issued in Japanese Appln. No. 2021-042855, dated Dec. 5, 2024. English machine translation provided.

(Continued)

*Primary Examiner* — Robert W Horn
(74) *Attorney, Agent, or Firm* — ROSSI, KIMMS & McDOWELL LLP

(57) ABSTRACT

An object of the present invention is to provide a tone plate that can be increased in strength and that can produce the original sound of the material. A tone plate 10 according to an aspect of the present invention includes: a surface layer 1 having a striking surface 1*a*; and a base layer 2 that is laminated directly or indirectly onto a face of the surface layer 1 on the side opposite to the striking surface 1*a*, wherein the surface layer 1 is a layer of wood impregnated with resin, and the base layer 2 is not impregnated with resin.

14 Claims, 6 Drawing Sheets

(56) References Cited

U.S. PATENT DOCUMENTS

| | | | | |
|---|---|---|---|---|
| 2004/0108017 | A1 | 6/2004 | Abe et al. | |
| 2016/0247493 | A1 | 8/2016 | Abe et al. | |
| 2018/0122343 | A1 | 5/2018 | Hirai et al. | |
| 2024/0005895 | A1* | 1/2024 | Tadano | G10D 13/10 |
| 2024/0038204 | A1* | 2/2024 | Hirai | G10D 13/02 |

FOREIGN PATENT DOCUMENTS

| | | | | | |
|---|---|---|---|---|---|
| JP | 2016156881 | A | | 9/2016 | |
| JP | 2018072656 | A | * | 5/2018 | G10D 13/06 |
| JP | 6614098 | B2 | | 12/2019 | |
| WO | WO-2022210212 | A1 | * | 10/2022 | G10D 13/08 |
| WO | WO-2022224685 | A1 | * | 10/2022 | G10D 13/10 |

OTHER PUBLICATIONS

International Search Report issued in Intl. Appln. No. PCT/JP2021/046141, mailed Feb. 22, 2022. English translation provided.

Written Opinion issued in Intl. Appln. No. PCT/JP2021/046141, mailed Feb. 22, 2022.

* cited by examiner

TONE PLATE AND PERCUSSION INSTRUMENT

TECHNICAL FIELD

The present invention relates to a tone plate and a percussion instrument.

BACKGROUND ART

A percussion instrument such as a marimba or a xylophone includes a plurality of tone plates as sound generating bodies. The tone plates generate sound when struck by a mallet. Wood such as rosewood, *Betula schmidtii* Regel, padouk, or quince wood, for example, is used as the material of the tone plate. It is desirable for the tone plate to produce the original sound of the wood or the like.

Meanwhile, when the tone plate is struck by the mallet, indentations or cracks may form. Hence, providing pores in a surface layer of a wooden tone plate and impregnating the tone plate with resin through the pores in order to increase the durability of the tone plate against being struck while being played has been proposed (PTL 1).

CITATION LIST

Patent Literature

[PTL 1] Japanese Patent No. 6614098

[PTL 2] Japanese Unexamined Patent Application Publication No. 2004-58416

SUMMARY OF INVENTION

Technical Problem

PTL 1 describes providing pores in the surface layer of a wooden tone plate and impregnating the tone plate with resin through the pores in order to increase the durability of the tone plate against being struck while being played. In PTL 1, however, the tone plate can only be impregnated with the resin from the striking surface side of the surface layer, and there is therefore room for improvement in terms of making the depth to which the resin impregnates the surface layer uniform. Furthermore, in PTL 1, the fibers of the wood are cut when the pores are drilled, and there is therefore room for improvement in terms of improving the uniform strength of the striking surface.

Note that PTL 2 describes a wood element for a musical instrument that is obtained by laminating a plurality of single wooden plates coated or impregnated with resin. However, the wood element for a musical instrument described in PTL 2 is used for a woodwind instrument such as a clarinet, and therefore differs from a tone plate for a percussion instrument. In other words, the problem of increasing the durability against being struck does not exist in this wood element for a musical instrument.

The present invention has been designed on the basis of the circumstances described above, and an object of the present invention is to provide a tone plate that can be increased in strength and that can produce the original sound of the material.

Solution to Problem

A tone plate according to an aspect of the present invention includes a surface layer having a striking surface, and a base layer that is laminated directly or indirectly onto a face of the surface layer on the side opposite to the striking surface, wherein the surface layer is a layer of wood impregnated with resin, and the base layer is not impregnated with resin.

DESCRIPTION OF EMBODIMENTS

Figure 1:
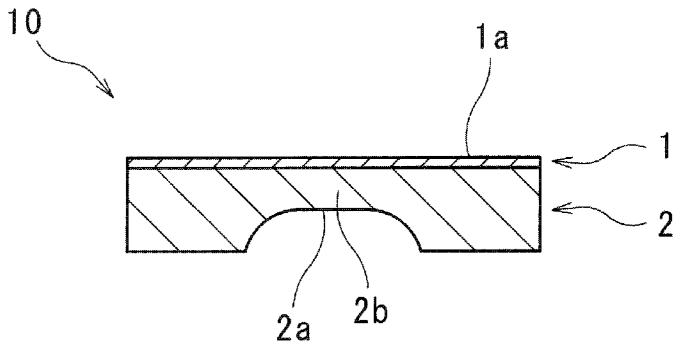
FIG. 1 is a schematic sectional view showing a tone plate according to an embodiment of the present invention.

A tone plate according to an aspect of the present invention includes a surface layer having a striking surface, and a base layer that is laminated directly or indirectly onto a face of the surface layer on the side opposite to the striking surface, wherein the surface layer is a layer of wood impregnated with resin, and the base layer is not impregnated with resin.

The base layer is preferably wood.

The wood of the surface layer is preferably a straight-grained board.

The striking surface preferably has an elongated shape, and the grain of the wood of the surface layer preferably extends along a longitudinal direction of the striking surface.

The tone plate preferably further includes an intermediate layer disposed between the surface layer and the base layer, wherein the intermediate layer contains oriented fibers, and the direction of the oriented fibers in the intermediate layer is orthogonal to the grain of the wood of the surface layer in a planar view.

A percussion instrument according to another aspect of the present invention includes a plurality of tone plates, wherein at least one of the plurality of tone plates is the tone plate described above.

The material of an uppermost layer on the striking surface side is preferably the same in all of the tone plates.

Note that in the present invention, "the direction of the oriented fibers in the intermediate layer is orthogonal to the grain of the wood of the surface layer in a planar view" means that the extension direction of the fibers of the intermediate layer (for example, when the intermediate layer includes wood, a direction extending along the core of the wood) and the extension direction of the grain of the wood of the surface layer are substantially orthogonal in the planar view. However, the present invention is not limited to a configuration in which the direction of the fibers of the intermediate layer and the grain of the wood of the surface layer are strictly orthogonal.

In the tone plate according to this aspect of the present invention, the surface layer is impregnated with resin and the base layer is not impregnated with resin, and therefore the strength on the striking surface side, which is more likely to be the cause of indentations and cracks, can be increased in a concentrated fashion. Moreover, the strength of the surface layer of the tone plate is increased by impregnating the surface layer with resin, and therefore the original sound of the wood is more likely to be produced both on the base layer, which is not impregnated with resin, and on the surface layer. Hence, this tone plate enables increasing the strength of the striking surface and producing sound with the original tone of the material. Moreover, even a material with low durability can be applied to the tone plate, and sound with the original tone of the material can be produced.

Embodiments of the present invention will be described in detail below while referring as appropriate to the figures. Note that with regard to the numerical values described in this specification, the described upper limit and lower limit values can be combined as desired. In this specification, it is assumed that the numerical value ranges from the upper limit values to the lower limit values that can be combined are all described as preferred ranges.

First Embodiment

<Tone Plate>

A tone plate 10 of FIG. 1 includes a surface layer 1 having a striking surface 1*a*, and a base layer 2 laminated directly or indirectly onto a face of the surface layer 1 on the side opposite to the striking surface 1*a*. The wood of the surface layer 1 is impregnated with resin. The base layer 2 is not impregnated with resin.

In the tone plate 10, the surface layer 1 and the base layer 2 are directly laminated. The surface layer 1 and the base layer 2 are fixed using an adhesive, for example. The tone plate 10 does not include layers other than the surface layer 1 and the base layer 2.

The tone plate 10 is used in a percussion instrument such as a marimba, a xylophone, or a vibraphone, for example. A percussion instrument normally includes a plurality of elongated tone plates. The tone plates have a striking surface that is struck by a mallet, and a recessed portion is provided in the face opposite to the striking surface. Typically, the tone plates used for the upper register have a smaller length in a longitudinal direction and a greater overall thickness than the tone plates used for the lower register. There are no particular limitations on the tone plate 10 of FIG. 1, but for example, the tone plate 10 can be used as a tone plate for the upper register.

(Surface Layer)

The surface layer 1 is a resin-impregnated layer formed by impregnating wood with resin. Due to being impregnated with the resin, the surface layer 1 has increased strength. Since the strength of the surface layer 1 is reinforced by impregnating the surface layer 1 with the resin, the original sound of the material is more likely to be produced. The striking surface 1*a* constitutes the uppermost face of the tone plate 10, which is struck by a mallet. The striking surface 1*a* has an elongated shape. The striking surface 1*a* may consist of a flat surface.

Wood generally has varied internal voids, and therefore, when the wood is impregnated only from a specific face thereof, it is difficult to control the impregnation depth of the resin, and accordingly difficult to maintain the desired quality. However, the surface layer 1 is provided as a separate member from the base layer 2 so that the resin is controlled to impregnate the surface layer alone, and as a result, the resin can impregnate the entire region in the thickness direction more easily. In the tone plate 10, only the surface layer 1 is impregnated with the resin (in other words, in the tone plate 10, no resin-impregnated layers other than the surface layer 1 exist). Hence, in the tone plate 10, by impregnating the surface layer 1 with the resin over the entire region in the thickness direction, it is possible to control the impregnation depth of the resin over the entire tone plate 10 easily and reliably in accordance with the thickness of the surface layer 1. According to this configuration, the resin can be disposed selectively on the striking surface 1*a* side in a required range over the entire tone plate 10. As a result, the original sound of the material is more likely to be produced over the entire tone plate 10.

As noted above, the surface layer 1 contains wood. Since the surface layer 1 of the tone plate 10 contains wood, a woody sound is more likely to be produced. Moreover, since the surface layer 1 contains wood, it is easier to sufficiently impregnate the surface layer 1 with the resin. The surface layer 1 may be a laminated body including wood in a plurality, but is preferably a single plate impregnated with the resin. Moreover, it is assumed that pores or fine grooves are not provided on the surface of the wood of the surface layer 1, but this does not exclude providing pores or fine grooves in order to improve the efficiency of the resin impregnation. Note, however, that from the viewpoint of preserving the fibers of the wood, when pores or fine grooves are provided, measure (s) such as providing micropores with an extremely small diameter or reducing the depth of the pores is/are taken so as to minimize damage to the fibers of the wood.

There are no particular limitations on the wood, but rosewood, padouk, quince wood, maple, hard maple, hornbeam, beech, oak, matoa, mahogany, birch, and so on may be cited as examples.

Figure 2:
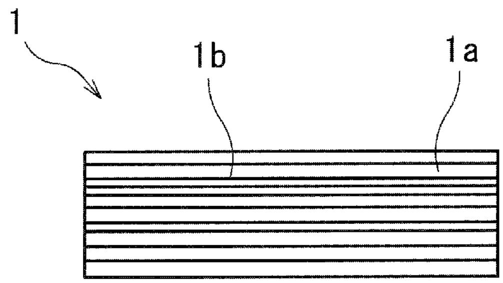
FIG. 2 is a schematic plan view of the tone plate of FIG. 1.

The wood may be a flat-grained board, for example. As shown in FIG. 2, however, the wood is preferably a straight-grained board. By using a straight-grained board as the wood, the appearance of the tone plate 10 can be improved. Moreover, from the viewpoint of improving the appearance of the tone plate 10, the grain of the wood preferably extends along the longitudinal direction of the striking surface 1*a*. Note that here, "straight-grained" denotes a tone plate material cut such that the average angle of the annual rings is within a range of ±45° relative to the vertical (the thickness direction of the surface layer) when viewed from the butt end (a cross-section on which the annual rings appear in a concentric shape).

The resin preferably impregnates the entire region of the wood. A resin with a larger specific gravity than the wood used is suitably used as the resin. There are no particular limitations on the resin, but a thermosetting resin that has low viscosity and can easily impregnate the wood is preferred. Examples of this thermosetting resin include epoxy resin, phenol resin, urea resin, polyester, acrylic resin, silicate resin, melamine resin, polyurethane, and so on.

The resin may contain a filling material (microparticles). Examples of the filling material include talc, glass fiber, and so on. By including the filling material in the resin, the strength of the surface layer 1 can be further increased.

(Base Layer)

The base layer 2 supports the surface layer 1 from the rear face side. Further, the base layer 2 controls the quality of the sound produced by the tone plate 10. As shown in FIG. 1, a recessed portion 2*a* is provided on the rear face of the base layer 2. The recessed portion 2*a* is formed in a central part of the base layer 2 in the longitudinal direction. The recessed portion 2*a* traverses the rear face of the base layer 2 in a latitudinal direction. The base layer 2 includes a thin portion 2*b* that is sunken in due to the recessed portion 2*a*. By providing the recessed portion 2*a* on the rear face of the base layer 2, the tone plate 10 is tuned so that frequency ratios in the fundamental mode and each higher order mode are substantially integral multiples.

As a lower limit of the thickness of the base layer 2 (the thickness of the part where the recessed portion 2*a* is not formed), when the tone plate 10 is used in a marimba, for example, 10.0 mm is preferable, 15.0 mm is more preferable, and 17.5 mm is even more preferable. Meanwhile, as an upper limit of the thickness of the base layer 2, when the tone plate 10 is used in a marimba, for example, 29.9 mm is preferable, 29.5 mm is more preferable, and 28.5 mm is even more preferable. The base layer 2 preferably occupies a large proportion of the entire tone plate 10 so that the sound quality of the tone plate 10 can be controlled. If the thickness does not satisfy the aforesaid lower limit, the proportion of the tone plate 10 occupied by the base layer 2 may be insufficient. On the other hand, if the thickness exceeds the aforesaid upper limit, the overall thickness of the tone plate 10 may become excessive. Note that the overall thickness of the tone plate 10 may vary according to the register in which the tone plate is to be used. For example, when the tone plate 10 is to be used in the upper register, a value near the upper limit values of the aforesaid ranges can be employed as the thickness of the base layer 2, and when the tone plate 10 is to be used in the lower register, a value near the lower limit values of the aforesaid ranges can be employed as the thickness of the base layer 2.

As noted above, the base layer 2 is not impregnated with the resin. As a result, changes in the sound quality due to the resin can be prevented from occurring in the base layer 2.

The base layer 2 is preferably wood. The types of wood cited as examples of the surface layer 1 may be cited as the wood constituting the base layer 2. By forming the base layer 2 of the tone plate 10 from wood, a woody sound is more likely to be produced. The type of the wood constituting the base layer 2 may be the same as or different from that of the surface layer 1.

The base layer 2 may be formed from wood which is singular (in other words, a single piece of wood). In this case, the tone plate 10 is formed by laminating a single plate constituting the surface layer 1 onto the wood which is singular and constitutes the base layer 2, for example.

<Manufacturing Method>

Next, an example of a manufacturing method for the tone plate 10 will be described. The manufacturing method for the tone plate includes: a step (a forming step) of forming the surface layer 1 impregnated with the resin; and a step (a laminating step) of laminating, to the base layer 2, the surface layer 1 formed in the forming step.

(Forming Step)

In the forming step, the wood serving as the main body of the surface layer 1 is impregnated with the resin. In the forming step, the wood is immersed in a solution containing the resin, after which the resin is cured by being heated or the like.

In the forming step, the wood is preferably immersed in the solution after inserting the wood and the solution in a chamber and decompressing the interior of the chamber. Moreover, in the forming step, the interior of the chamber is preferably pressurized to or above atmospheric pressure in a state in which the wood is immersed in the solution. By decompressing the interior of the chamber in the forming step, air present in the wood can be removed, making it easier to introduce the resin into the voids in the wood. Furthermore, by pressurizing the interior of the chamber in a state in which the wood is immersed in the solution, the resin can easily be pressed into the wood. According to this procedure, the resin can easily impregnate the interior of the wood evenly, and the resin can easily impregnate the entire region of the wood. As a result, the overall quality of the surface layer 1 can be controlled uniformly, and variation in the internal strength of the surface layer 1 can be suppressed. Thus, a vibration transmission rate can easily be increased while suppressing the occurrence of cracks and indentations in the tone plate 10. Note that in the forming step, the above procedure may be repeated two or more times.

(Laminating Step)

In the laminating step, the surface layer 1 formed in the forming step and the base layer 2, which is prepared separately, are fixed together using an adhesive.

<Advantages>

In the tone plate 10, the surface layer 1 is impregnated with the resin and the base layer 2 is not impregnated with the resin, and therefore the strength of the tone plate 10 on the striking surface 1*a* side, which is more likely to be the cause of indentations and cracks, can be increased in a concentrated fashion. Furthermore, by impregnating the tone plate 10 with the resin, the strength of the surface layer 1 can be increased, and as a result, the original sound of the material is more likely to be produced on the surface layer 1. More specifically, in the tone plate 10, it is not necessary to replace the wood serving as the main body of the surface layer 1 with another material in order to increase the strength on the striking surface 1*a* side, and therefore the desired sound can be generated easily. As a result, the tone plate 10 can produce the original sound of the material while being increased in strength. Moreover, even a material with low durability can be applied to the tone plate, and sound with the original tone of the material can be produced.

In the tone plate 10, the surface layer 1 and the base layer 2 both contain wood and do not include layers other than wood layers. As a result, the tone plate 10 is more likely to produce a woody sound.

As described above, the tone plate 10 can be used as a tone plate for the upper register of a percussion instrument. In a tone plate for the upper register, the base layer is comparatively thick, and therefore cracking of the entire tone plate can easily be suppressed. However, in a tone plate for the upper register, it is necessary to be able to suppress the occurrence of partial indentations that may be formed when the tone plate is struck by a mallet. As regards this point, the tone plate 10 includes the surface layer 1 impregnated with the resin, and therefore the occurrence of partial indentations can be suppressed.

Second Embodiment

<Tone Plate>

Figure 3:
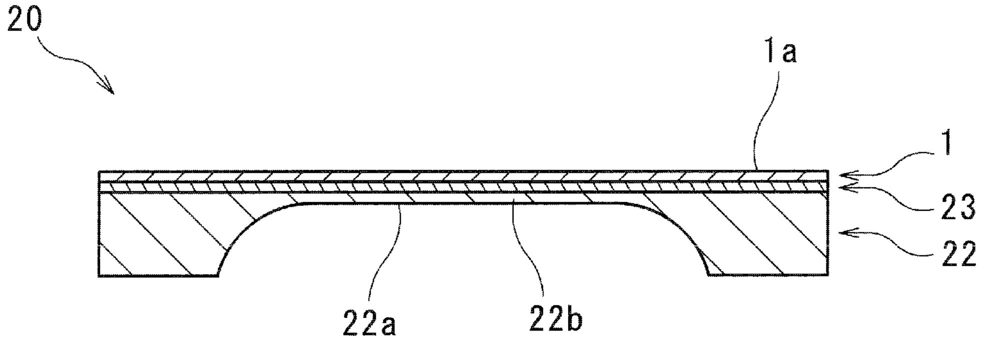
FIG. 3 is a schematic sectional view showing a tone plate according to a different embodiment to the tone plate of FIG. 1.

A tone plate 20 shown in FIG. 3 includes the surface layer 1 having the striking surface 1*a*, and a base layer 22 laminated indirectly onto a face of the surface layer 1 on the side opposite to the striking surface 1*a*. The tone plate 20 also includes an intermediate layer 23 disposed between the surface layer 1 and the base layer 22. The surface layer 1 is impregnated with resin. The base layer 22 is not impregnated with resin. Other than the longitudinal direction length, the surface layer 1 is configured similarly to the surface layer 1 of FIG. 1, and therefore identical reference numerals have been allocated thereto and description thereof has been omitted.

The surface layer 1, the intermediate layer 23, and the base layer 22 are fixed using an adhesive, for example. The surface layer 1, the intermediate layer 23, and the base layer 22 are disposed in that order from the striking surface 1*a* side to the rear face side. The tone plate 20 does not include any layers other than the surface layer 1, the intermediate layer 23, and the base layer 22. There are no particular limitations on the tone plate 20, but the tone plate 20 can be used as a tone plate for the lower register, for example.

(Base Layer)

The base layer 22 supports the surface layer 1 and the intermediate layer 23 from the rear face side. Further, the base layer 22 controls the quality of the sound produced by the tone plate 20.

A recessed portion 22*a* is provided on the rear face of the base layer 22. The recessed portion 22*a* is formed in a central part of the base layer 22 in the longitudinal direction. The recessed portion 22*a* traverses the rear face of the base layer 22 in the latitudinal direction. The base layer 22 includes a thin portion 22*b* that is sunken in due to the recessed portion 22*a*. The thin portion 22*b* of the base layer 22 is thinner than the thin portion 2*b* of the base layer 2 shown in FIG. 1. Further, the longitudinal direction length of the base layer 22 is greater than the longitudinal direction length of the base layer 2 shown in FIG. 1. Other than the thin portion 22*b* being thinner and the longitudinal direction length being greater, the base layer 22 can be formed similarly to the base layer 2 of FIG. 1.

(Intermediate Layer)

The intermediate layer 23 may be impregnated with resin. Note, however, that the intermediate layer 23 is preferably not impregnated with resin. By selectively impregnating the surface layer 1 with resin, the occurrence of partial indentations that may be formed when the tone plate 20 is struck with a mallet can be suppressed. Hence, to ensure that the original sound of the material can be produced, the layers other than the surface layer 1 are preferably not impregnated with resin.

The intermediate layer 23 contains oriented fibers. The intermediate layer 23 preferably contains wood as the material containing the oriented fibers. More specifically, the intermediate layer 23 is preferably formed from wood. In the tone plate 20, the intermediate layer 23 contains wood, and therefore the main bodies of all of the surface layer 1, the intermediate layer 23, and the base layer 22 can be formed from wood. The types of wood cited as examples of the surface layer 1 can be cited as the wood contained in the intermediate layer 23. From the viewpoint of preventing cracking of the tone plate 20, the intermediate layer 23 preferably contains wood having a larger specific gravity than the wood constituting the base layer 22 so that the strength of the tone plate 20 is increased.

The intermediate layer 23 may be formed by laminating a plurality of single plates in the thickness direction, but is preferably formed from one single plate. As a lower limit of the thickness of the intermediate layer 23, when the tone plate 20 is used in a marimba, for example, 0.1 mm is preferable, 0.3 mm is more preferable, and 0.5 mm is even more preferable. Meanwhile, as an upper limit of the thickness of the intermediate layer 23, when the tone plate 20 is used in a marimba, for example, 3 mm is preferable, 1.5 mm is more preferable, and 1.0 mm is even more preferable. When the thin portion 22*b* of the base layer 22 is too thin, cracks are more likely to form in the tone plate 20. The intermediate layer 23 is provided mainly to suppress such cracks. In this respect, when the thickness does not satisfy the lower limits described above, the strength of the intermediate layer 23 may be insufficient, and as a result, it may not be possible to sufficiently suppress cracking of the tone plate 20. Conversely, when the thickness exceeds the upper limits described above, the manufacturing cost of the tone plate 20 may increase, and the overall thickness of the tone plate 20 may become too great.

Figure 4:
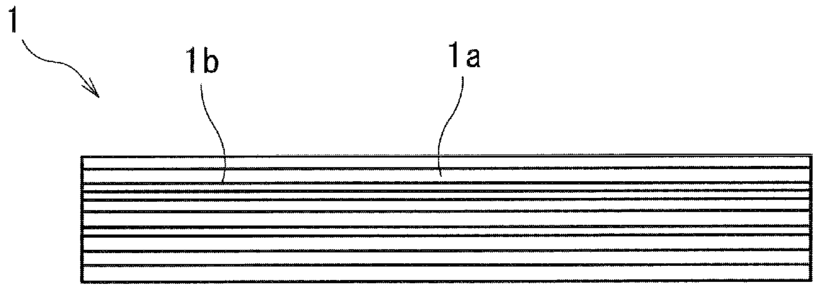
FIG. 4 is a schematic plan view of the tone plate of FIG. 3.
Figure 5:
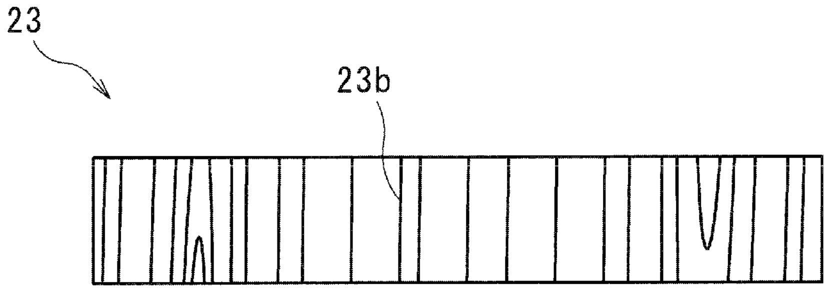
FIG. 5 is a schematic view showing a striking surface-side face of an intermediate layer of the tone plate of FIG. 3.

The direction of the fibers in the intermediate layer 23 is preferably orthogonal to the grain of the wood of the surface layer 1 in a planar view. More specifically, as shown in FIGS. 4 and 5, grain 23*b* of the wood of the intermediate layer 23 is preferably orthogonal to grain 1*b* of the wood of the surface layer 1 in the planar view. According to this configuration, cracking of the tone plate 20 can be more reliably suppressed. Moreover, by making the grain 23*b* of the wood of the intermediate layer 23 orthogonal to the grain 1*b* of the wood of the surface layer 1 when seen from above, it is easier to make the grain 23*b* of the wood of the intermediate layer 23 cross a crack growth direction. Hence, cracking of the tone plate 20 can easily be suppressed even when wood having a comparatively low specific gravity is used as the intermediate layer 23, for example. As a result, the freedom to select the thickness of the intermediate layer 23 and the freedom to select the type of wood increase, making it easier to improve the sound quality of the tone plate 20.

<Manufacturing Method>

A manufacturing method for the tone plate 20 includes, for example, a step (a forming step) for forming the surface layer 1 impregnated with the resin, and a step (a laminating step) for laminating the surface layer 1 formed in the forming step, the intermediate layer 23, and the base layer 22 in that order.

The forming step can be performed by a similar procedure to that of the forming step performed in the manufacturing method for the tone plate 10 of FIG. 1. In the laminating step, the surface layer 1, the intermediate layer 23, and the base layer 22 are fixed by an adhesive, for example.

<Advantages>

In the tone plate 20, the intermediate layer 23 is provided between the surface layer 1 and the base layer 22, and therefore cracking of the tone plate 20 can be sufficiently suppressed even when the tone plate 20 is used as a tone plate for the lower register, for example.

Third Embodiment

<Percussion Instrument>

Figure 6:
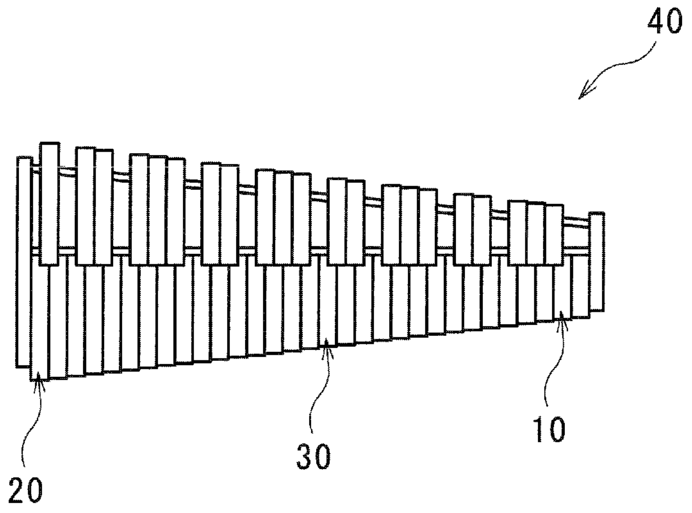
FIG. 6 is a schematic plan view showing a percussion instrument according to an embodiment of the present invention.

A percussion instrument 40 shown in FIG. 6 includes a plurality of tone plates. The percussion instrument 40 includes the tone plate 10 of FIG. 1 or the tone plate 20 of FIG. 3 (the tone plate 10 of FIG. 1 and the tone plate 20 of FIG. 3 will also be referred to hereinafter as the "first tone plate 10" and the "second tone plate 20", respectively) as at least one of the tone plates. The percussion instrument 40 may include only the first tone plate 10 and the second tone plate 20 as the plurality of tone plates, or may also include a third tone plate 30 other than the first tone plate 10 and the second tone plate 20. In addition, when the percussion instrument 40 includes only the first tone plate 10 and the second tone plate 20 as the plurality of tone plates, the percussion instrument 40 may include only either the first tone plate 10 or the second tone plate 20, or may include both the first tone plate 10 and the second tone plate 20. The percussion instrument 40 is a marimba, a xylophone, a vibraphone, or the like, for example.

In the percussion instrument 40, the material of the uppermost layer on the striking surface side is preferably the same in all of the tone plates. More specifically, in the percussion instrument 40, the first tone plate 10 and the second tone plate 20 both include the surface layer 1 impregnated with the resin. Further, the surface layer 1 of the first tone plate 10 and the surface layer 1 of the second tone plate 20 both contain wood. Hence, when all of the tone plates are constituted by the first tone plate 10 and the second tone plate 20, the material of the uppermost layer on the striking surface side is the same in all of the tone plates of the percussion instrument 40. On the other hand, when the percussion instrument 40 includes the third tone plate 30 as well as the first tone plate 10 and the second tone plate 20, by employing a configuration in which wood is impregnated with resin as the uppermost layer of the third tone plate 30, the material of the uppermost layer on the striking surface side can be made the same in all of the tone plates. By making the material of the uppermost layer on the striking surface side the same in all of the tone plates of the percussion instrument 40, it is easier to achieve a uniform quality in all of the tone plates. Note that from the viewpoint of promoting uniformity in the quality of all of the tone plates, the type of the wood disposed on the uppermost layer on the striking surface side is preferably the same. Moreover, the grain of the wood disposed on the uppermost layer on the striking surface side is preferably the same, and the type of resin impregnating the wood is preferably the same. Furthermore, the type of coating or paint is preferably the same.

<Advantages>

The percussion instrument 40 includes at least one of the first tone plate 10 and the second tone plate 20, and therefore the strength of the tone plate can be increased and the original sound of the material can be produced.

Other Embodiments

The configuration of the present invention is not limited to the above embodiments. Accordingly, in the above embodiments, constituent elements of the respective parts of the embodiments can be omitted, replaced, or added on the basis of the disclosure in the present specification and technical common knowledge, and all of these omissions, replacements, and additions are to be interpreted as belonging to the scope of the present invention.

For example, the percussion instrument to which the tone plate is applied is not limited to the percussion instruments described above. The tone plate may be used in castanets, woodblocks, cajons, wooden fish, chimes, and so on, for example.

The tone plate is preferably a laminated body of the surface layer and the base layer or the surface layer, the intermediate layer, and the base layer. However, the tone plate may also include a layer other than the intermediate layer between the surface layer and the base layer.

The constituent material of the base layer can be set as appropriate in accordance with the required sound quality, and a material other than wood may be used. Moreover, a fiber-reinforced resin such as carbon fiber-reinforced plastic (CFRP), for example, can be used as the constituent material of the intermediate layer.

The grain of the wood included in the surface layer does not have to extend along the longitudinal direction of the striking surface. Moreover, the grain of the wood of the surface layer and the direction of the fibers in the intermediate layer do not have to be orthogonal in the planar view. For example, the grain of the wood of the surface layer and the fibers of the intermediate layer may be arranged parallel to each other in the planar view.

The first tone plate and the second tone plate, described above, can be disposed as desired in accordance with the specifications of the percussion instrument. Furthermore, for example, by adjusting the depth or the like of the recessed portion provided in the base layer, the first tone plate may be used as a tone plate for the lower register and the second tone plate may be used as a tone plate for the upper register.

INDUSTRIAL APPLICABILITY

As described above, the tone plate according to an aspect of the present invention has increased strength and is suitable for producing the original sound of the material.

REFERENCE SIGNS LIST

1 Surface layer
1*a* Striking surface
1*b*, 23*b* Grain
2, 22 Base layer
2*a*, 22*a* Recessed portion
2*b*, 22*b* Thin portion
10, 20 Tone plate
23 Intermediate layer
30 Third tone plate
40 Percussion instrument

The invention claimed is:

1. A tone plate, comprising:
a surface layer having a striking surface and a fixing surface opposite across a thickness of the surface layer from the striking surface; and
a base layer fixed to the fixing surface of the surface layer,
wherein the surface layer is a layer of wood that contains a resin, and
the base layer is a resin-free layer.

2. The tone plate according to claim 1, wherein the base layer is a resin-free layer of wood.

3. The tone plate according to claim 1, wherein the wood of the surface layer is a straight-grained board.

4. The tone plate according to claim 1, wherein the striking surface has an elongated shape, and a grain of the wood of the surface layer extends along a longitudinal direction of the striking surface.

5. The tone plate according to claim 1, further comprising:
an intermediate layer disposed between the surface layer and the base layer such that the base layer is fixed to the intermediate layer, and the intermediate layer is fixed to the fixing surface of the surface layer,
wherein the intermediate layer contains oriented fibers, and
wherein a direction of the oriented fibers in the intermediate layer is orthogonal to a grain of the wood of the surface layer in a planar view.

6. The tone plate according to claim 2, wherein the tone plate includes only the surface layer that is the layer of wood that contains the resin and the base layer that is the resin-free layer of wood.

7. The tone plate according to claim 1, wherein the base layer is directly fixed to the fixing surface of the surface layer.

8. The tone plate according to claim 2, further comprising an intermediate layer disposed between the surface layer and the base layer such that the base layer is fixed to the intermediate layer, and the intermediate layer is fixed to the fixing surface of the surface layer.

9. The tone plate according to claim 8, wherein the base layer is directly fixed to the intermediate layer, and the intermediate layer is directly fixed to the fixing surface of the surface layer.

10. The tone plate according to claim 8, wherein the tone plate includes only the surface layer that is the layer of wood that contains the resin, the base layer that is the resin-free layer of wood, and the intermediate layer disposed between the surface layer and the base layer.

11. The tone plate according to claim 8, wherein the intermediate layer is another resin-free layer of wood.

12. The tone plate according to claim 8, wherein the surface layer is impregnated with the resin from the striking surface to the fixing surface.

13. A percussion instrument, comprising:

a plurality of tone plates, wherein at least one tone plate of the plurality of tone plates comprises:

a surface layer having a striking surface and a fixing surface opposite across a thickness of the surface layer from the striking surface; and a base layer fixed to the fixing surface of the surface layer, wherein the surface layer is a layer of wood that contains a resin, and the base layer is a resin-free layer.

14. The percussion instrument according to claim 13, wherein all of the plurality of tone plates comprise the surface layer that is the layer of wood that contains the resin, and a material of an uppermost layer on a striking surface side of the surface layer is the same in all of the plurality of tone plates.

* * * * *